Aug. 29, 1961 V. G. ROSS 2,997,800
CLIP-ON CHRISTMAS TREE RAIN ORNAMENT
Filed Jan. 13, 1959 2 Sheets-Sheet 1
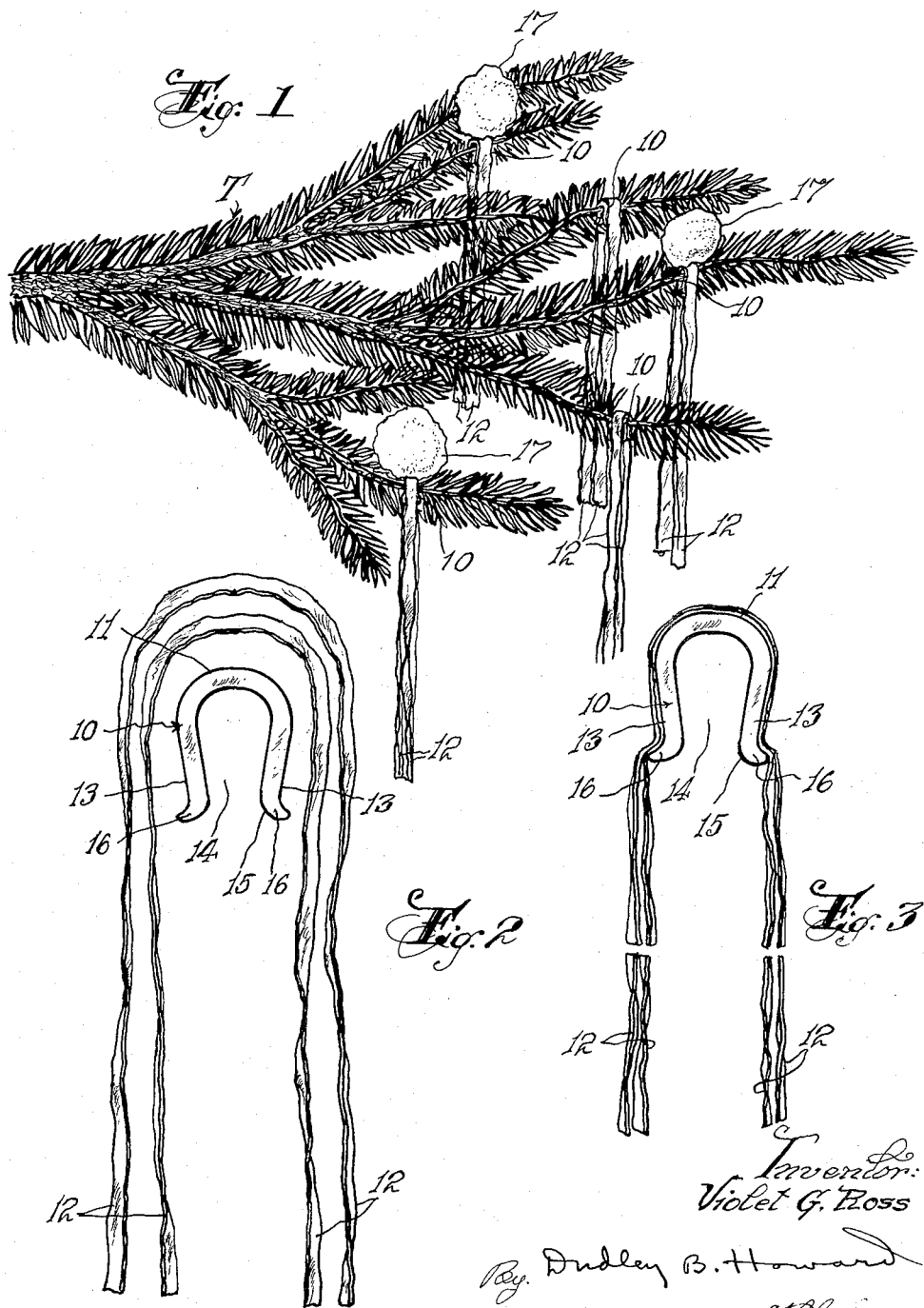

Aug. 29, 1961     V. G. ROSS     2,997,800
CLIP-ON CHRISTMAS TREE RAIN ORNAMENT
Filed Jan. 13, 1959     2 Sheets-Sheet 2
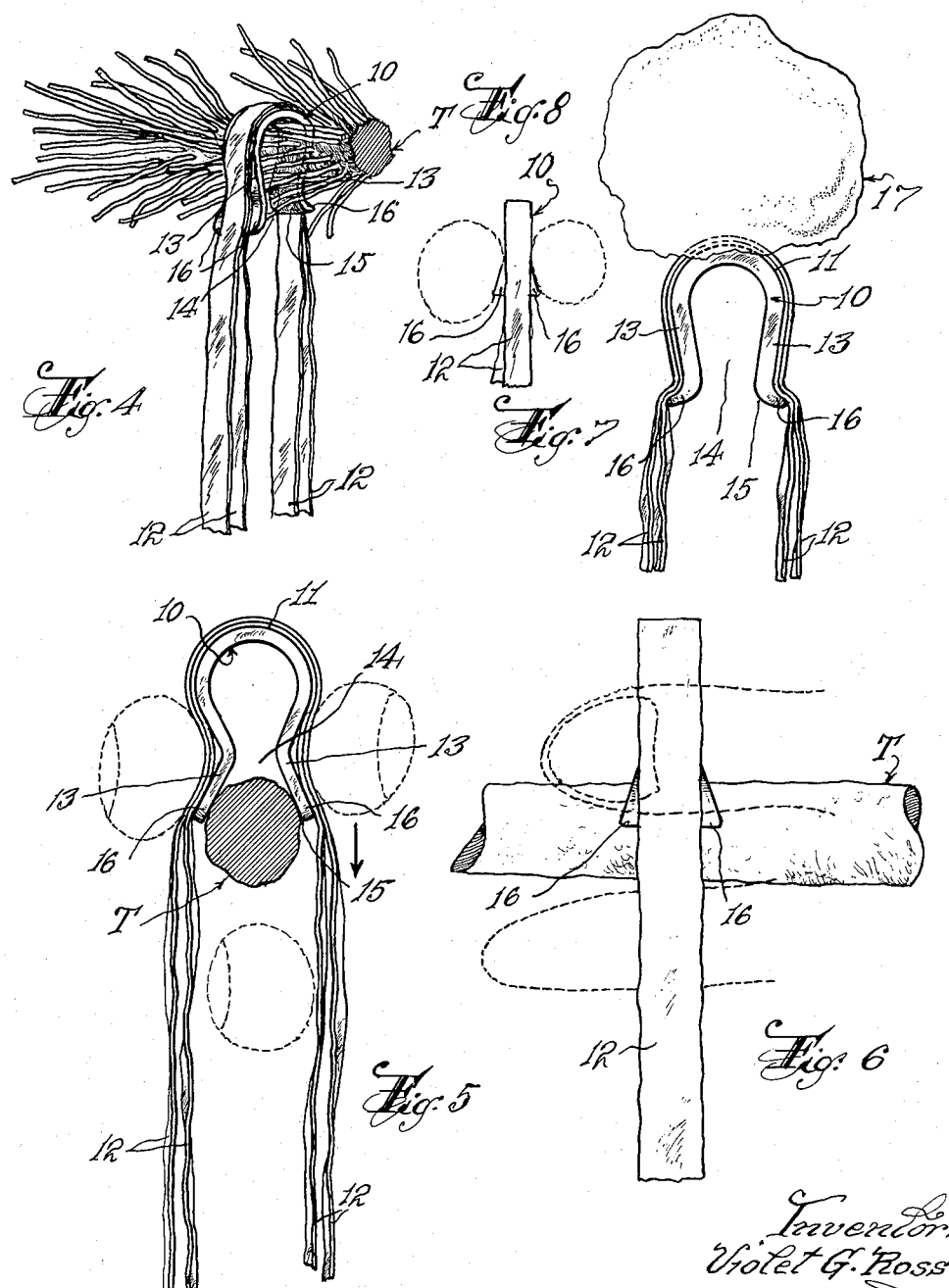

United States Patent Office 2,997,800
Patented Aug. 29, 1961

2,997,800
CLIP-ON CHRISTMAS TREE RAIN ORNAMENT
Violet G. Ross, 104 Mt. Airy Road, Basking Ridge, N.J.
Filed Jan. 13, 1959, Ser. No. 786,601
3 Claims. (Cl. 41—10)

The invention relates in general to Christmas tree ornaments and has particular reference to the shiny tinsel strips of silvery metallic appearance that are draped on the branches of a tree in suspended relation thereto to create the visual effect of falling drops of rain or icicles.

Prior to my present invention, the so-called "rain" or "icicle" material has been obtainable only in bundles of tinsel strips which are arranged in substantial parallelism. Each such bundle usually is threaded through a hole in a display card and then is doubled upon itself at a central bight portion and folded into closely embracing relation to the opposite flat faces of the card. This is the form in which it customarily is marketed.

Application of rain or icicle ornamentation to a Christmas tree when obtainable in the bundle arrangement just mentioned presents numerous disadvantages. In the first place, the several strips become twisted and intertwined so as to render separation of a bundle into single strips or into individual groupings of two or more strips quite difficult. In this act of separation, some of the strips break and the severed pieces fall on the floor around the base of the tree in an untidy manner. Another disadvantage is the manual difficulty with which individual groupings are pinched off from a bundle of standard size in an effort to divide the latter into groupings of selected uniform size or number of component strips. Due to this difficulty in apportionment, the separated groupings usually vary from two or three strips to a dozen, especially after the tree trimmer is becoming tired of the monotonous and seemingly interminable work. Because the detached strips must be balanced painstakingly at their midpoints on the supporting tree branches to prevent them from slipping off endwise and falling onto the floor, it is customary to hang the regular ornaments first and apply the rain afterward. This means that after the regular ornaments have been applied, there still remains the long task of applying the rain which requires careful, tedious avoidance of the regular ornaments when hanging the rain in properly balanced positions one tiny strip at a time. This takes so long that the tree trimmer inevitably becomes weary of the whole business and just throws the rest of the tinsel strips on the lower branches. That is why so many Christmas trees seem to fall away on the bottom.

With the above-enumerated disadvantages of Christmas tree rain in the form in which heretofore marketed in mind, it is the primary object of my present invention to provide rain, or icicles, in the form of individual regular ornaments of uniform size which always will be evenly balanced on the tree branches without any required effort to adjust the balance and may be applied at the same time the decorative balls, bells, and other regular ornaments are hung.

To be more explicit, each of my rain, or icicle, ornaments comprises a saddle-clip to straddle the selected tree branch and a predetermined number of tinsel strips, such as two or slightly more, which are doubled on themselves medially so as to be well-balanced and are draped over the saddle-clip in straddling relation thereto and permanently affixed in suitable manner, as by the use of an adhesive binder.

Another object of the invention is to provide a saddle-clip that is made of resilient material and shaped so that it will snap onto and off of a straddled tree branch in the acts of engagement and disengagement, respectively, to insure firm application to the tree and permit re-use on successive holiday occasions.

A further object is to provide a saddle clip that is of inverted U-shape and has depending skirts that are splayed into a width exceeding that of the attached tinsel strips in order to present laterally exposed wing-like finger-grips which will permit the tree trimmer to manipulate the ornament in clip-on engagement and slip-off detachment with sufficient force but without danger of damaging tractional pull on the comparatively fragile tinsel strips.

Still further objects, advantages and features of the invention will become apparent as the following specific description is read in connection with the accompanying drawings, in which:

FIG. 1 is a perspective view of a broken-away branch of a Christmas tree showing rain ornaments constructed in accordance with the invention applied thereto in appropriate locations.

FIG. 2 is an exploded front elevational view of a saddle-clip of plastic construction and a pair of superimposed tinsel strips in their proper relative arrangement immediately preceding final assembly; FIG. 3 is a front elevation of the assembled ornament; and FIG. 4 is a fragmentary perspective view of the tip portion of a tree branch with the saddle-clip engaged therewith.

FIG. 5 is a front elevation of an ornament constructed in accordance with the invention but wherein the saddle-clip is made of resilient sheet metal, showing in broken lines one way in which the device may be gripped between the thumb and one finger of one hand with another, preferably the fourth finger, in a position to separate and suitably space the tinsel strips in the act of engaging it with a tree branch while the other hand holds the branch steady; and FIG. 6 is a side elevation of the same.

FIG. 7 is a front elevation of a modified ornament having a cotton tuft representation of a snowball affixed to the saddle-clip in surmounting relation thereto.

FIG. 8 is a side elevation of the invention, showing in broken lines an alternative manner in which the saddle-clip may be grasped.

Referring now in detail to the drawings, wherein like reference characters designate corresponding parts in the several views, FIGS. 2 and 3 show the construction and mode of assembly of the component parts of one of the rain, or icicle, ornaments, which includes attachment means preferably in the form of a saddle-clip 10 made of plastic material possessing suitable resiliency. The device shown was hand-made so is somewhat crude in construction and the method of fabrication is likely to be far different in quantity production.

By hand, a flat strip of clear plastic material approximately one-eighth of an inch in width and thickness was cut into blanks about 1½ inches long. The finished saddle-clip 10 was formed by doubling the blank on itself into substantially the form of an inverted letter U. At the bight in the bent blank a laterally flat supporting seat 11 of comparatively large-radius twig-embraceable curvature for the tinsel strips 12 is provided. The side portions of the blank are bent downward to form comparatively short counterbalanced skirts 13 of equal length, which are first turned obliquely inward to produce branch-underlying retainer throats 14 and then obliquely outward into a receiving mouth 15. The skirts 13 are thinned and splayed as shown in FIGS. 4 and 6 to form comparatively wide wing-like finger-grips 16 of greater lateral width than one-eighth of an inch. By "splayed" it is meant that each skirt 13 is widened in the plane thereof beyond the one-eighth of an inch width of tinsel-supporting seat 11, whereby wing-like finger-grips 16 are formed. This important shape of the skirts is entirely distinct from the above-described successive oblique inward and outward turning of the skirts to produce retainer throat 14 and receiving mouth 15.

Each tinsel strip 12 is substantially one-eighth of an inch wide, so, when medially resting upon the seat 11 of saddle-clip 10 in the straddling position shown in FIGS. 4 to 6, the wings of finger-grips 16 will project laterally beyond the side edges of strip 12 and will be exposed for direct finger contact by a tree trimmer in the act of engaging the device with a tree branch T or disengaging it therefrom in either of the alternative modes of finger grasp illustrated in FIGS. 5 and 8. Each tinsel strip is of normally long extent and, when doubled upon itself and arranged with its bight portion supported by the seat 11 of saddle-clip 10, will have its side portions suspended in counterbalanced relation.

If only one tinsel strip 12 is to be used in an ornament, it is affixed to saddle-clip 10 by suitable means, such as adhesive cement. Any additional strips, such as the one shown, are superimposed upon the first strip in parallelism and coextensive therewith and are similarly adhered to said first strip and to each other.

It is to be understood that I am not to be restricted to the precise dimensions of parts shown in the drawings, nor to the particular materials employed by way of illustration. The tinsel strips 12 may be made of aluminum or other metal foil, or may be of paper or plastic coated with metal or other shiny substances. They may even be made of colored paper to represent the coloration of rain or icicles caused by exposure to colored light. The saddle-clip 10 may be made of sheet metal, as shown in FIGS. 5 and 6, instead of plastic, or from any other relatively stiff and preferably resilient material.

When attaching one of the regular rain, or icicle, ornaments of my invention to a Christmas tree in a selected location, the tree branch is held steady by one hand while the other hand grips the saddle-clip of the ornament. There are at least two alternative ways in which the saddle-clip may be grasped. As depicted in FIG. 5, the finger-grip wings 16 of both skirts may be included in the grasp of the thumb and one finger (preferably the third finger). At the same time, the fourth finger may be inserted between the opposite side strips 12 to space them suitably for straddling the tree branch. Because the wings 16 are exposed laterally beyond the side edges of tinsel strips 12, the contacting thumb and finger will exert downward traction on said wings only as the ornament is pressed downward into straddling branch engagement and cannot accidentally tear or break the fragile strips. The same is true of the alternative mode of operation represented in FIG. 8, in accordance with which the opposite finger-grip wings 16—16 of one skirt 13 only of saddle-clip 10 are grasped by thumb and finger.

In FIG. 7 there is shown a modification of my invention wherein a substantially spherical tuft of cotton is affixed to saddle-clip 10 by suitable means in surmounting relation to the said clip and its attached tinsel strips 12 to represent a snowball ornament 17. It should be clearly apparent that the addition of snowball 17 increases the utility of finger-grip wings 16, because it is not necessary to press downward upon the snowball when forcing saddle-clip 10 into slip-on engagement with the branch T of a Christmas tree. Consequently, the snowball 17 need not be compressed into flattened undesirable shape, since wings 16 will take the downward thrust by direct finger contact.

It will be understood that it is intended to cover all changes and modifications of the examples of the invention herein chosen for the purpose of illustration which do not constitute departures from the spirit of the invention and scope of the appended claims.

I claim:

1. A Christmas tree ornament comprising: a saddle-clip of resilient material adapted to detachably straddle a tree branch and being substantially of inverted U-shape, said saddle-clip including a comparatively large-radius medial seat portion and depending short counterbalanced skirts of substantially equal length; and at least one long strip of decorative material doubled upon itself and affixed to the saddle-clip with its bight portion straddling the seat portion thereof and its side portions suspended alongside the respective skirts and projecting to a considerable distance below the latter in counterbalanced relation.

2. A Christmas tree ornament as defined in claim 1, wherein the lower terminal portions of the saddle-clip skirts are splayed or widened in the respective planes thereof to provide laterally projecting finger-grip portions of wider expanse than the seat portion which supports the straddling strips of decorative material and are exposed for direct finger contact.

3. A Christmas tree ornament as defined in claim 1, wherein the lower terminal portions of the saddle-clip skirts are splayed or widened in the respective planes thereof to provide laterally projecting finger-grip portions of wider expanse than the seat portion which supports the straddling strip of decorative material and are exposed for direct finger contact, the side edges of said splayed skirt portions being downwardly obliquely flaring to provide substantially acute lower finger-grip corners.

References Cited in the file of this patent

UNITED STATES PATENTS

| | | |
|---|---|---|
| 487,127 | Moore | Nov. 29, 1892 |
| 1,695,290 | Leff | Dec. 18, 1928 |
| 2,118,166 | Clark | May 24, 1938 |
| 2,245,903 | Cone | June 17, 1941 |